United States Patent [19]

Foo

[11] Patent Number: 5,621,574
[45] Date of Patent: Apr. 15, 1997

[54] OBJECTIVE LENS SYSTEM UTILIZING AXIAL GRADIENT INDEX (GRIN) LENS ELEMENTS

[75] Inventor: Leslie D. Foo, San Jose, Calif.

[73] Assignee: Nikon Corporation, Japan

[21] Appl. No.: 412,642

[22] Filed: Mar. 29, 1995

[51] Int. Cl.⁶ .............................. G02B 3/00; G02B 9/36; G02B 9/60
[52] U.S. Cl. .......................... 359/653; 359/768; 359/776
[58] Field of Search .................................... 359/652, 653, 359/768, 776

[56] References Cited

U.S. PATENT DOCUMENTS

| | | | |
|---|---|---|---|
| 4,810,070 | 3/1989 | Suda et al. | 359/653 |
| 4,840,467 | 6/1989 | Takada et al. | 359/653 |
| 4,883,522 | 11/1989 | Hagerty et al. | 65/18.4 |
| 4,929,065 | 5/1990 | Hagerty et al. | 350/413 |
| 5,044,737 | 9/1991 | Blankenbecler | 359/653 |
| 5,235,464 | 8/1993 | Tsuchida | 359/652 |

FOREIGN PATENT DOCUMENTS

| | | |
|---|---|---|
| 0275809 | 12/1986 | Japan . |
| 406059190 | 3/1994 | Japan . |

OTHER PUBLICATIONS

Richard N. Pfisterer, "Design of a 35-mm Photographic Objective Using Axial GRIN Materials," 10 pages.

P.J. Sands, "Inhomogeneous Lenses, IV. Aberrations of Lenses with Axial Index Distributions," *Journal of The Optical Society of America*, vol. 61, No. 8, Aug., 1971, pp. 1086–1091.

"Optical Design with Linear Axial Gradient Index Materials," 8 pages.

Paul K. Manhard, "Advantages of Non Linear Axial Gradients in Optical Design," 6 pages.

*Primary Examiner*—Scott J. Sugarman
*Attorney, Agent, or Firm*—Skjerven, Morrill, MacPherson, Franklin & Friel; Norman R. Klivans

[57] ABSTRACT

Axial gradient index of refraction lens elements are used in a lens system, for instance for a photographic objective lens, to correct monochromatic and chromatic lens aberrations, thereby reducing the number of lens elements required to achieve good optical performance in the overall lens design compared to for instance a lens system using aspheric lenses. The gradient index (GRIN) lens elements are bi-convex and/or meniscus type lens elements. The large refractive index gradients as well as large dispersion value gradients provide aberration correction in the overall lens system. A high aperture ratio lens system uses six lens elements where the first and last lens elements are positive power lens elements having refractive index and/or dispersion gradients along the optical axis.

11 Claims, 7 Drawing Sheets

OBJECTIVE LENS SYSTEM UTILIZING AXIAL GRADIENT INDEX (GRIN) LENS ELEMENTS

BACKGROUND OF THE INVENTION

1. Field of the Invention

This invention relates generally to lens systems and more specifically to a lens system suitable for use as an objective lens and using elements which exhibit axial gradient index of refraction.

2. Description of Prior Art

U.S. Pat. Nos. 4,883,522; 4,907,864; 4,929,065; and 5,200,858 each to Hagerty et al. disclose gradient optical density transmission of light directing devices and fabrication thereof. For instance, U.S. Pat. No. 4,929,065 discloses that a glass block comprises a plurality of intermediate glass plates stacked between a top plate and a bottom plate. The top and bottom plates each have a selected composition, with a particular index of refraction and a softening temperature. The intermediate plates have compositions intermediate those of the top and bottom plates and are stacked so as to provide a gradient in composition from top to bottom. This assembly is heated to fuse the plates together thus resulting in a single lens element which has a gradient in its refractive index in the range of for instance 0.085 to 0.5 or greater. This axial gradient index lens element provides aberration correction and design simplifications over conventional lenses including aspheric lenses. This process allows production of gradient index (GRIN) lens elements of relatively large diameter. Such lenses are especially suitable for replacement of conventional molded glass aspheric lenses, which are expensive to manufacture in large diameter and to close optical tolerances.

Axial GRIN lens elements have refractive index profiles that vary along a given axis (typically the optical axis). The axial index contours are thus planes perpendicular to the optical axis. The gradient of the index of refraction need not be linear, but has been found by most lens designers that it is easier to work with linear axial gradients for purposes of analysis. Although the index of refraction of GRIN lens elements is directly controlled, the dispersion characteristics (Abbe number) of the GRIN material is not so controlled.

"Design of a 35-mm Photographic Objective Using Axial GRIN Materials" by Richard N. Pfisterer, SPIE Volume 2000, July 1993, discloses design of a photographic objective lens system employing axial GRIN elements. The lens system has four lens elements with symmetry about a central aperture stop and has two GRIN lens elements, these being the lens elements closest to the object and closest to the image. There is a very small amount of residual oblique spherical aberration. The performance was found to be superior to any configuration using aspheric lens surfaces but without GRIN lens elements. That is, the GRIN elements improved chromatic aberration correction over conventional aspherical lens elements.

Due to the relative recent advent of such large diameter GRIN lens elements, their application has not been wide spread, and use to date of such lenses has concentrated on their index of refraction characteristics without regard to other characteristics. For instance, the above-mentioned Pfisterer paper overly emphasizes the role of the GRIN lens element as opposed to the effect of utilizing high index glass materials (without gradient) to correct optical aberration. The Pfisterer paper demonstrates that use and characteristics of GRIN lenses are not well understood. Moreover, prior art GRIN lens systems have emphasized chromatic aberration correction for meniscus lens shapes.

SUMMARY

In accordance with the present invention a multi-element lens system uses GRIN lens elements to correct monochromatic and chromatic lens aberration, thereby reducing the number of lens elements required to achieve desired optical performance. The GRIN lens elements are bi-convex and/or meniscus type and use their large refractive index gradients as well as large dispersion gradients to provide aberration correction in the overall lens system.

Thus in accordance with the invention a high aperture ratio lens system includes e.g. six lens elements. At least one of the lens elements is a positive lens element whose refractive index and/or dispersion changes (has a gradient) along the direction of the optical axis. In one embodiment a first such GRIN lens element is located in a front lens group (nearest the object), and preceding an aperture stop, and a second GRIN lens element is located in the rear lens group following the aperture stop. Particular numerical relationships have been found to be especially beneficial in terms of the optical power of the GRIN lens elements to the relative amount of refractive index and/or dispersion change. Advantageously, correction of chromatic aberration is achieved by use of GRIN lenses also having a dispersion value gradient. Thereby the GRIN lens elements behave somewhat like a conventional cemented achromatic doublet lens. This is an improvement over the prior art for GRIN lens elements where only the index of refraction was regarded as a parameter to be used for aberration correction.

In accordance with the invention the GRIN lens elements in a lens system for use for instance as a photographic objective lens each has a ratio of the index of refraction gradient to the index of refraction of the lens element in a range of $\frac{1}{10}$ to $\frac{3}{4}$. Alternatively, or in addition, the dispersion gradient of each GRIN lens element as a ratio to the dispersion of the lens element is in the range of $\frac{1}{6}$ to $\frac{1}{3}$. In this case each gradient (index and dispersion) is from the object (front) side to the image (rear) side surfaces of a particular GRIN lens element.

It has also been found that the ability of a GRIN lens element to correct or balance aberrations in an optical system is related to the optical power of a lens element compared to the optical power of the entire system. Thus, a ratio of the optical power of the GRIN lens element(s) to that of the total optical system is optimized in accordance with the invention, and this ratio provides a single measure of the overall effect the particular GRIN lens element has on its ability to correct aberration of the optical system.

Thus, in one embodiment a first GRIN lens element in the front group (object side) of the lens system has a ratio of its focal length to the focal length of the entire lens system in a range of $1\frac{1}{2}$ to 3, whereas the second GRIN lens element in the rear group (image side) has a ratio of its focal length to that of the entire optical system in the range of $\frac{1}{2}$ to 1.

The above parameters may be combined for each GRIN lens element. Thus each GRIN lens element may be specified in terms of a focal length (optical power) ratio, index of refraction ratio, and dispersion ratio for an optimum lens system.

DETAILED DESCRIPTION OF THE PREFERRED EMBODIMENTS

Figure 1:
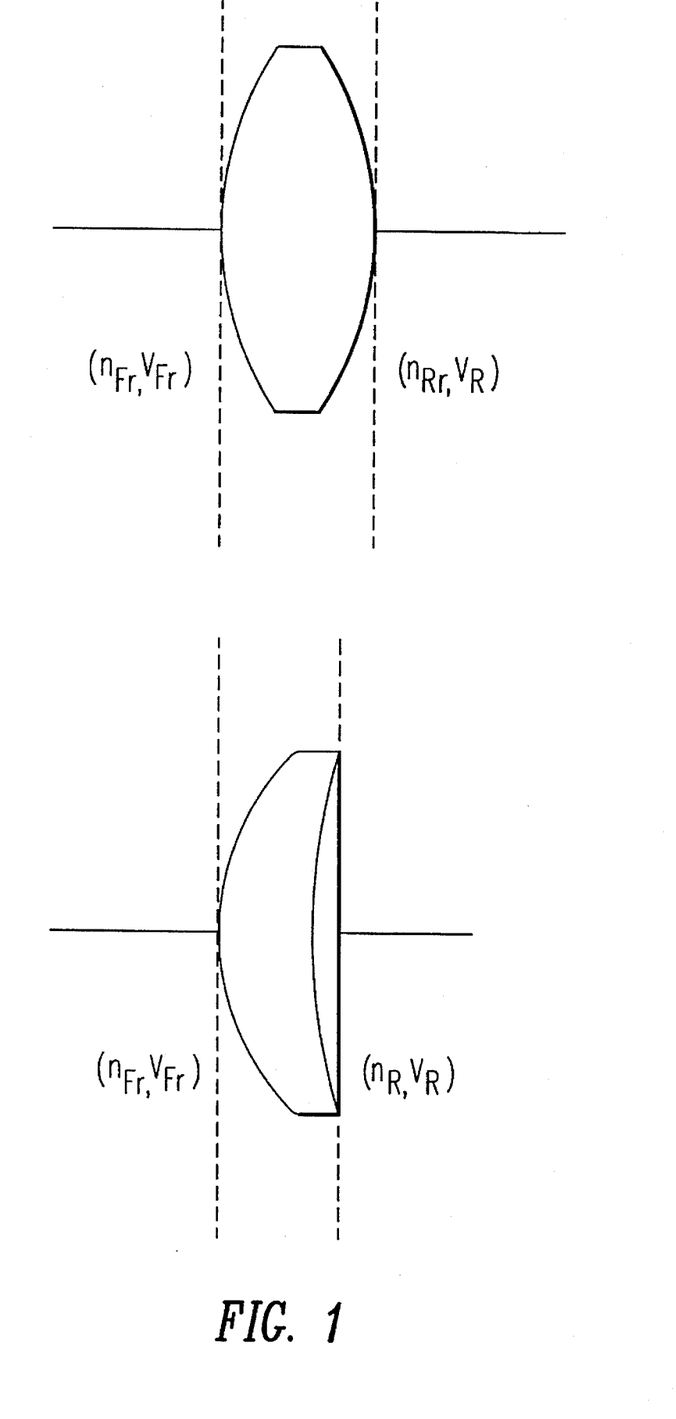
FIG. 1 illustrates the parameters used to define certain embodiments of the present invention.

FIG. 1 illustrates the terminology used herein to define the nature of the index and dispersion gradients for GRIN lens elements shown are two GRIN lens elements arranged along a (horizontal) optical axis. The subscript Fr refers to the front (object) side and the subscript R refers to the rear (image) side. The variables n and v refer respectively to the local index of refraction and the Abbe number, $v=[n(\lambda_F)-n(\lambda_C)]/[n(\lambda_d)-1]$, of the GRIN material. Thus, for the lens elements in FIG. 1, the refractive index gradient is given as $\Delta n=(n_{Fr}-n_R)$ and the dispersion gradient is given as $\Delta v=(v_{Fr}-v_R)$ where the Fr and R subscripts denote the planes perpendicular to the optical axis at the extreme positions of the lens surface. The subsequent figures included herein maintain this convention wherein the left side of the drawing is the object side and the right side is the image side, and the optical axis is a horizontal line.

Figure 2:
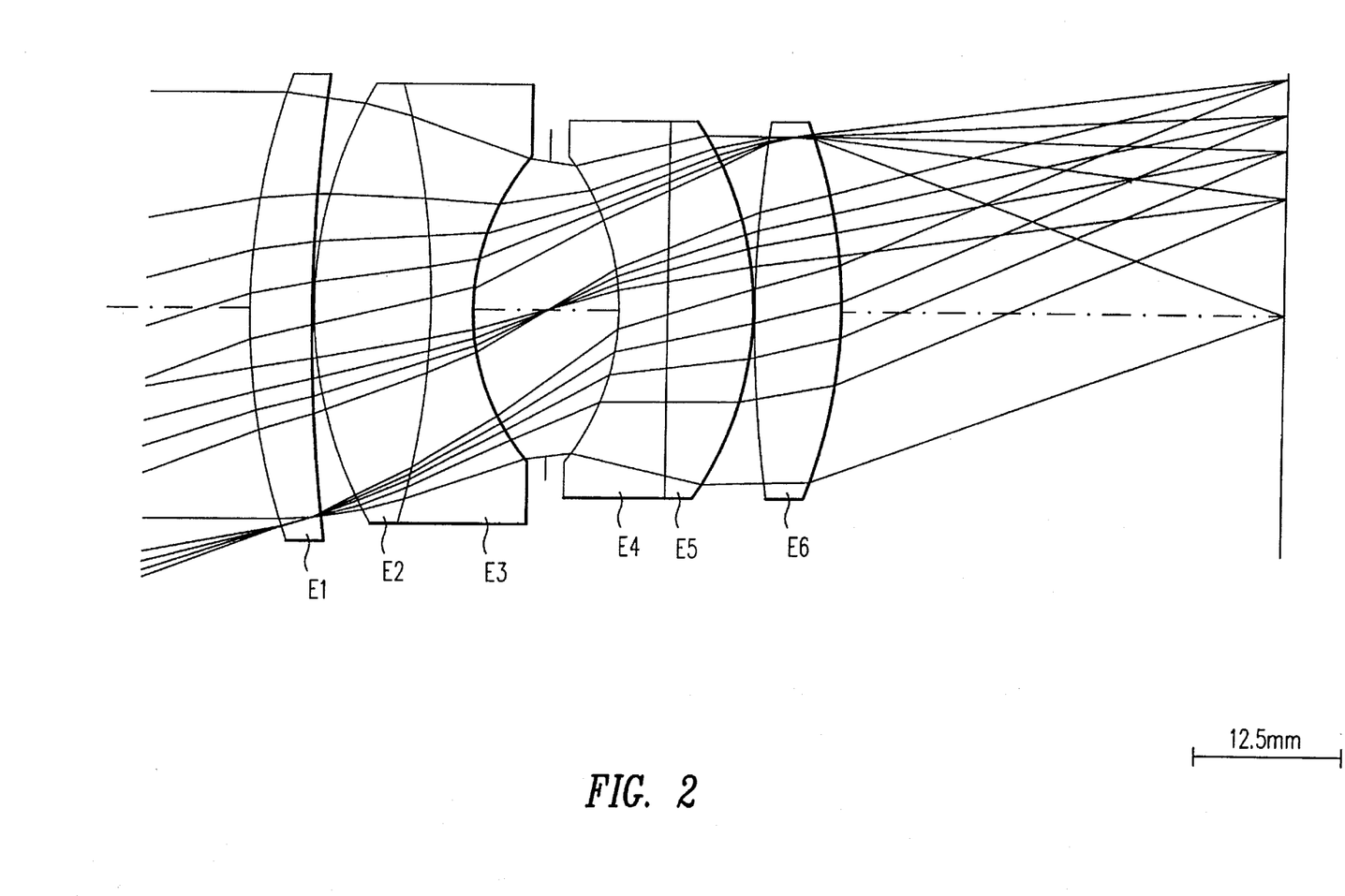
FIG. 2 shows a first example of a lens systems which utilizes GRIN lens elements in accordance with the present invention.

FIG. 2 shows a cross section of a lens system having six lens elements E1, . . . , E6 in accordance with a first embodiment of the present invention for use for instance as a high speed photographic objective lens. The ray tracings are generated by a computer program of a type well known in optical engineering. In this embodiment the GRIN lens elements are the first (leftmost) and the sixth (rightmost) lens elements respectively E1 and E6. These GRIN lens elements E1, E6 may be fabricated by the above-described method of U.S. Pat. No. 4,929,065. The aperture stop is depicted by the small vertical lines between the third E3 and fourth E4 lens elements. The lens prescription for this assembly is shown in Table I.

TABLE I

| Lens prescription for Example 1. | | | | | |
|---|---|---|---|---|---|
| | RDY | THI | GLA | | Element |
| OBJ: | INFINITY | INFINITY | | | |
| 1: | 70.12595 | 5.800000 | 'g1' | | E1 |
| 2: | 140.69079 | 0.100000 | | | |
| 3: | 41.59626 | 10.037292 | 803181.463799 | | E2 |
| 4: | −77.56245 | 3.800000 | 603420.380299 | | E3 |
| 5: | 22.84637 | 6.496686 | | | |
| STO: | INFINITY | 6.420800 | | | |
| 7: | −21.24697 | 3.800000 | 784701.260768 | | E4 |
| 8: | −765.92367 | 7.832550 | 803181.463799 | | E5 |
| 9: | −32.08652 | 0.100000 | | | |
| 10: | 127.36280 | 7.400000 | 'g10' | | E6 |
| 11: | −50.07149 | 39.074360 | | | |
| IMG: | INFINITY | −0.048416 | | | |
| WL | 656.28 | 587.56 | 546.07 | 486.13 | 435.84 |
| 'g1' | 1.797984 | 1.803181 | 1.807300 | 1.815304 | 1.824957 |
| C1 | −0.3777E−01 | −0.3802E−01 | −0.3822E−01 | −0.3859E−01 | 0.3903E−01 |
| 'g10' | 1.617272 | 1.620411 | 1.622870 | 1.627558 | 1.633122 |
| C1 | 0.2442E−01 | 0.2470E−01 | 0.2492E−01 | 0.2537E−01 | 0.2592E−01 |
| | | INFINITE CONJUGATES | | | |
| | EFL | | 55.0000 | | |
| | BFL | | 39.0744 | | |
| | FFL | | −13.7478 | | |
| | FNO | | 1.4230 | | |
| | IMG DIS | | 39.0259 | | |
| | OAL | | 51.7873 | | |
| | | PARAXIAL IMAGE | | | |
| | HT | | 21.6000 | | |
| | ANG | | 21.4413 | | |
| | | ENTRANCE PUPIL | | | |
| | DIA | | 38.6506 | | |
| | THI | | 26.3965 | | |
| | | EXIT PUPIL | | | |
| | DIA | | 52.9536 | | |
| | THI | | −36.2789 | | |

There is no requirement that the GRIN lens element be in the front and rear positions; other locations and configurations of the GRIN lens elements were investigated and also found to provide substantial benefit. For instance in other embodiments, only one GRIN lens element was used and in others the GRIN lens elements were in locations other than shown in FIG. 2. The second through fifth lens elements E2, . . . , E5 shown in FIG. 2 in this example are constructed from conventional optical glasses. Both lens doublets E2 and E3, E4 and E5 proximate to the aperture stop are cemented to reduce manufacturing complexity.

Figure 3A:
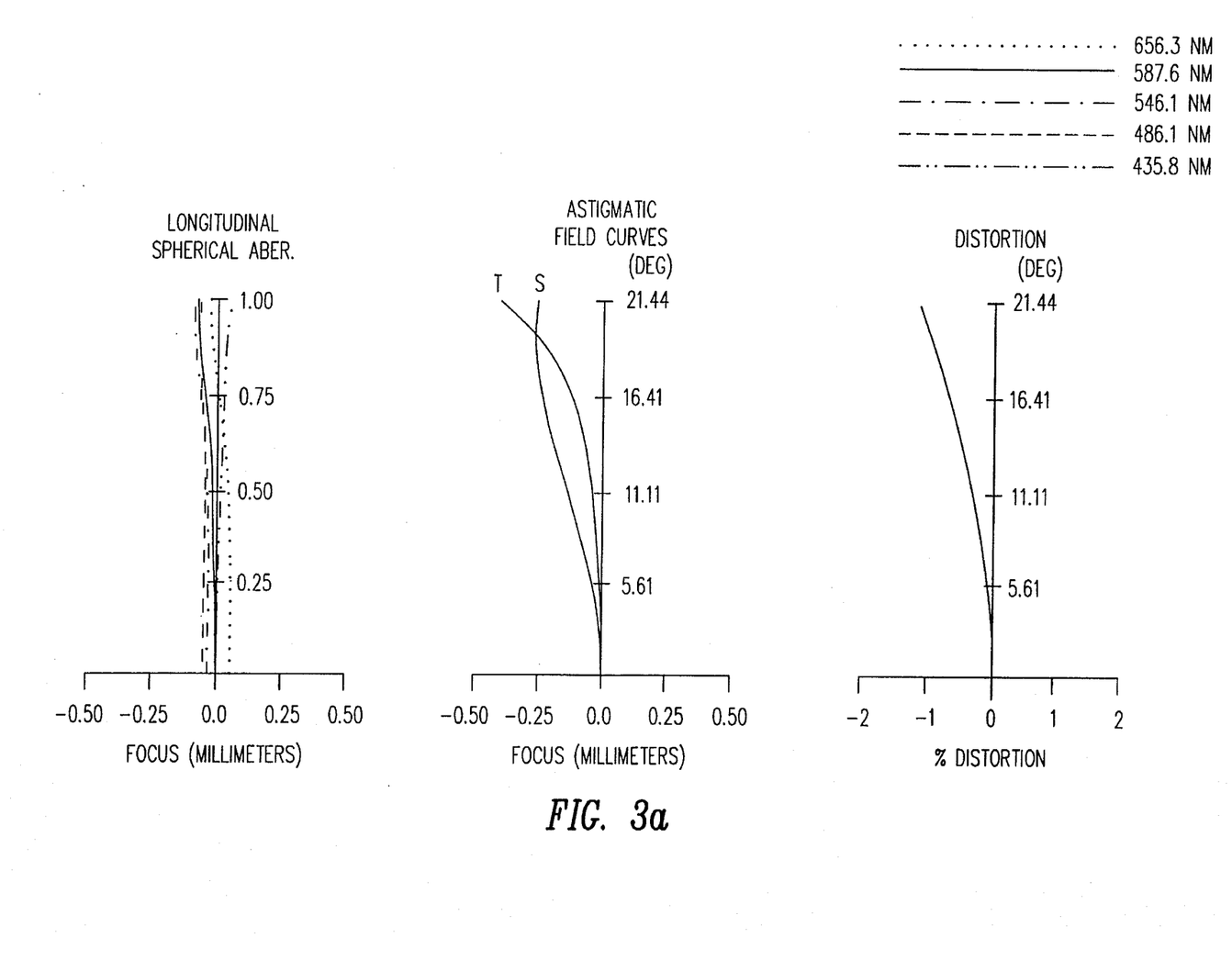
FIGS. 3a and 3b depict the optical performance characteristics of the lens system of FIG. 2.
Figure 3B:
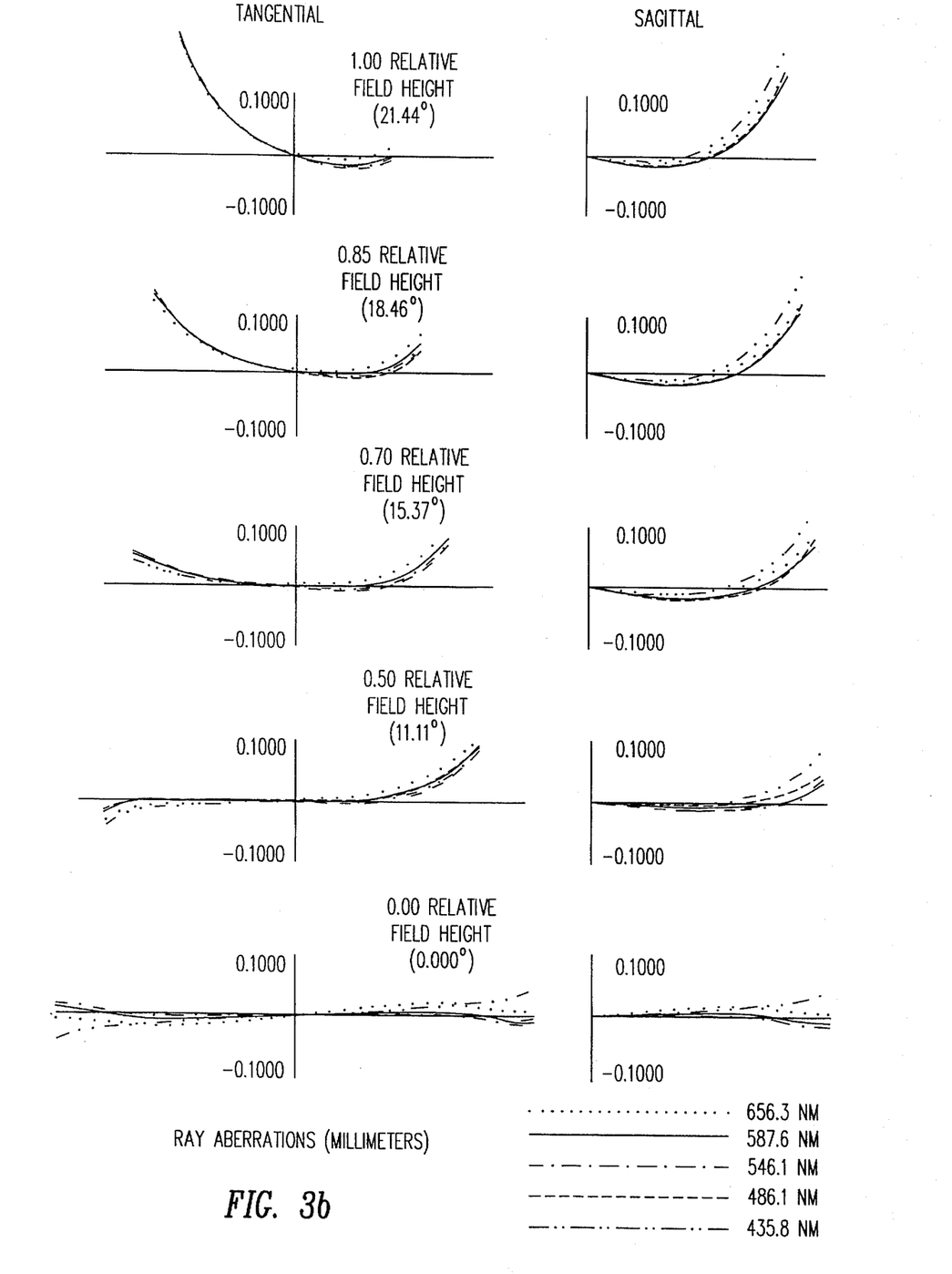

FIGS. 3a and 3b depict the expected optical performance of the lens assembly shown in FIG. 2. FIG. 3a shows the spherical aberration, astigmatic, and distortion correction achieved by the lens assembly. FIG. 3b shows the polychromatic transverse ray aberration plot of the lens assembly at various positions in the field-of-view.

The lens configuration of FIG. 2 exhibits good monochromatic and polychromatic aberration correction. The first GRIN lens element E1 is used primarily to correct spherical aberration and coma while the second GRIN lens element E6 is used primarily to correct astigmatism and chromatic aberrations.

Since the front GRIN lens element E1 has a negligible dispersion gradient, $\Delta v(\lambda_2) \cong 0$, it does not provide significant chromatic aberration correction but, is effective in balancing monochromatic aberration since the index gradient is fairly large, $\Delta n(\lambda_2) \cong -0.221$. The GRIN material is defined by a base index of refraction and a linear slope coefficient:

$n(\lambda,z) = n_0(\lambda) + c_1(\lambda)z$ $\lambda$ = wavelength of light $z$ = axial distance from the plane perpendicular to the optical axis at the extreme of the front surface, where $n_0(\lambda)$ is the index of refraction at wavelength, $\lambda$, at the plane $z=0$. In this case, the GRIN material for element E1 is defined in Table II at five different wavelengths $\lambda_1$-$\lambda_5$, the C-, d-, e-, F, and g- lines respectively.

TABLE II

Description of front GRIN lens element, Example 1.

| Wavelength(nm) | $n_0(\lambda)$ | $c_1(\lambda)$ |
|---|---|---|
| $\lambda_1$ 656.28 | 1.797984 | −0.03777 |
| $\lambda_2$ 587.56 | 1.803181 | −0.03802 |
| $\lambda_3$ 546.07 | 1.807300 | −0.03822 |
| $\lambda_4$ 486.13 | 1.815304 | −0.03859 |
| $\lambda_5$ 435.84 | 1.824957 | −0.03903 |

Since the $c_1$ coefficient of this GRIN material is negative, the index of refraction decreases as one moves from the front to the back of the lens element.

The rear GRIN lens element E6 has a dispersion gradient, $\Delta v(\lambda_2) \cong -13.9$, and provides chromatic correction in addition to monochromatic aberration correction made possible with an index gradient, $\Delta n(\lambda_2) \cong +0.200$. Table III represents the data used to model this GRIN material of the rear element E6.

TABLE III

Description of rear GRIN lens element, Example 1.

| Wavelength(nm) | $n_0(\lambda)$ | $c_1(\lambda)$ |
|---|---|---|
| $\lambda_1$ 656.28 | 1.617272 | +0.02442 |
| $\lambda_2$ 587.56 | 1.620411 | +0.02470 |
| $\lambda_3$ 546.07 | 1.622870 | +0.02492 |
| $\lambda_4$ 486.13 | 1.627558 | +0.02537 |
| $\lambda_5$ 435.84 | 1.633122 | +0.02592 |

Since the $c_1$ coefficient in of this GRIN material is positive, the index of refraction increases as one moves from the front to the back of the lens element E6.

A second lens system in accordance with the present invention is shown in FIG. 4, again including six lens elements E'1, . . . , E'6 where again the front element E'1 and rear element E'6 are GRIN lens elements. This lens system is intended to improve the optical performance over that of the first lens system of FIG. 2 by further correcting higher order field dependent aberrations and by exploiting the aberration correction capabilities of the GRIN lens further. This was achieved by altering the lens system of FIG. 2 by separating the two lens elements of the first cemented doublet (the second and third lens elements E'2 and E'3) and thus allowing an "air lens" to form between lens elements E'2 and E'3. This results in improved optical performance, especially near the edge of the field. There is, however, a slight increase in secondary color.

Figure 4:
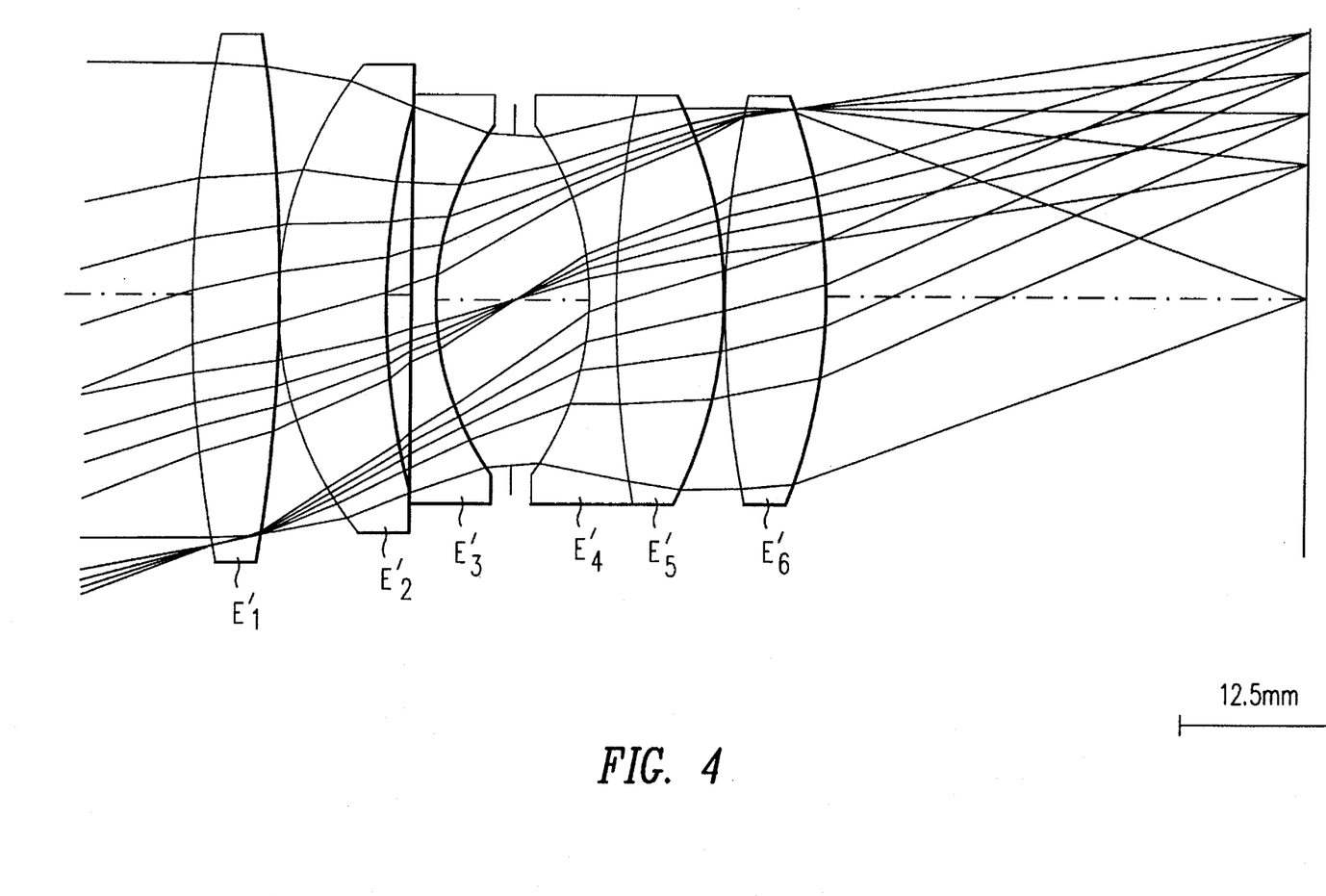
FIG. 4 shows a second example of a lens system which utilizes GRIN lens elements in accordance with the present invention.
Figure 5A:
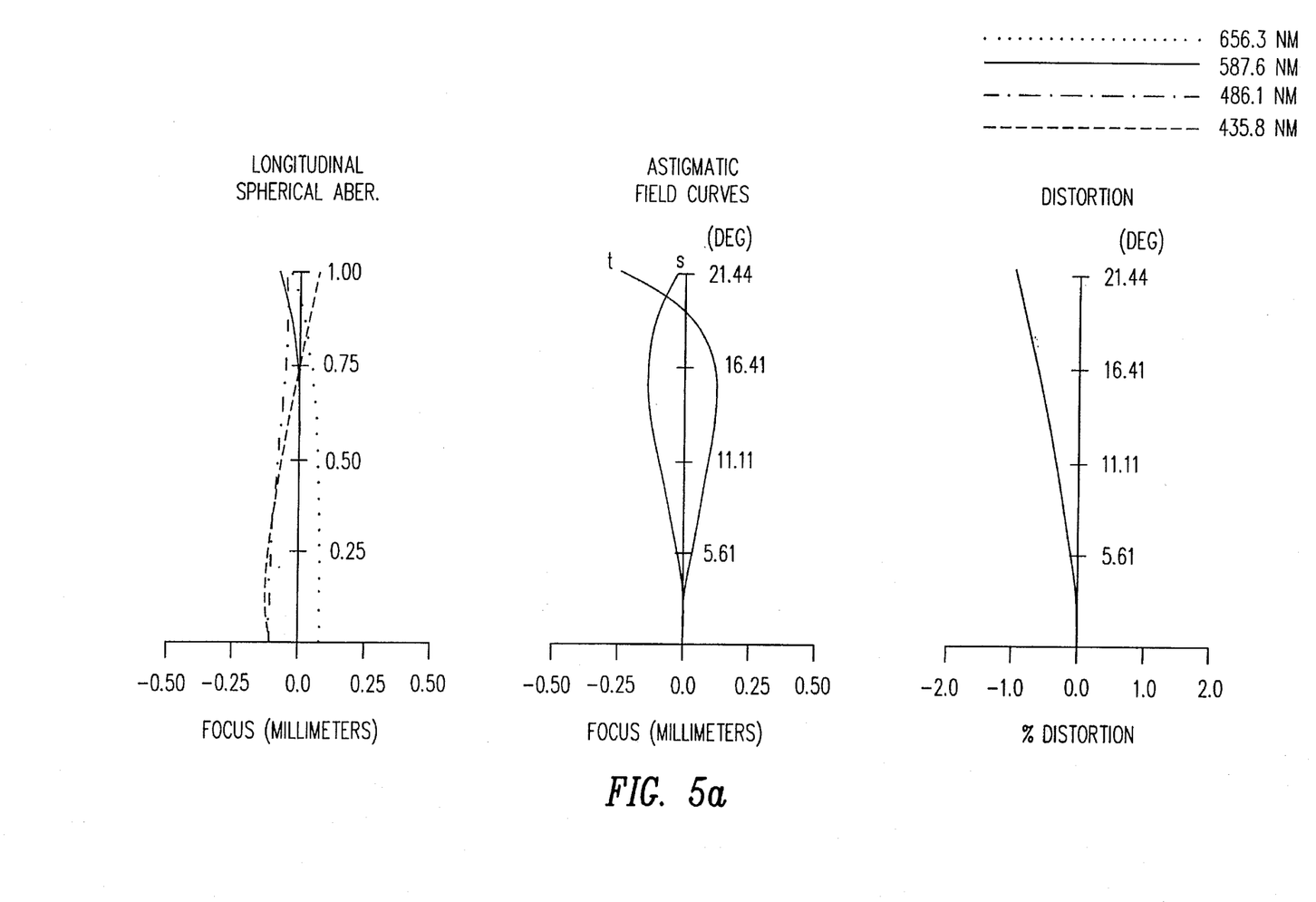
FIGS. 5a and 5b depict the optical performance characteristics of the lens system of FIG. 4.
Figure 5B:
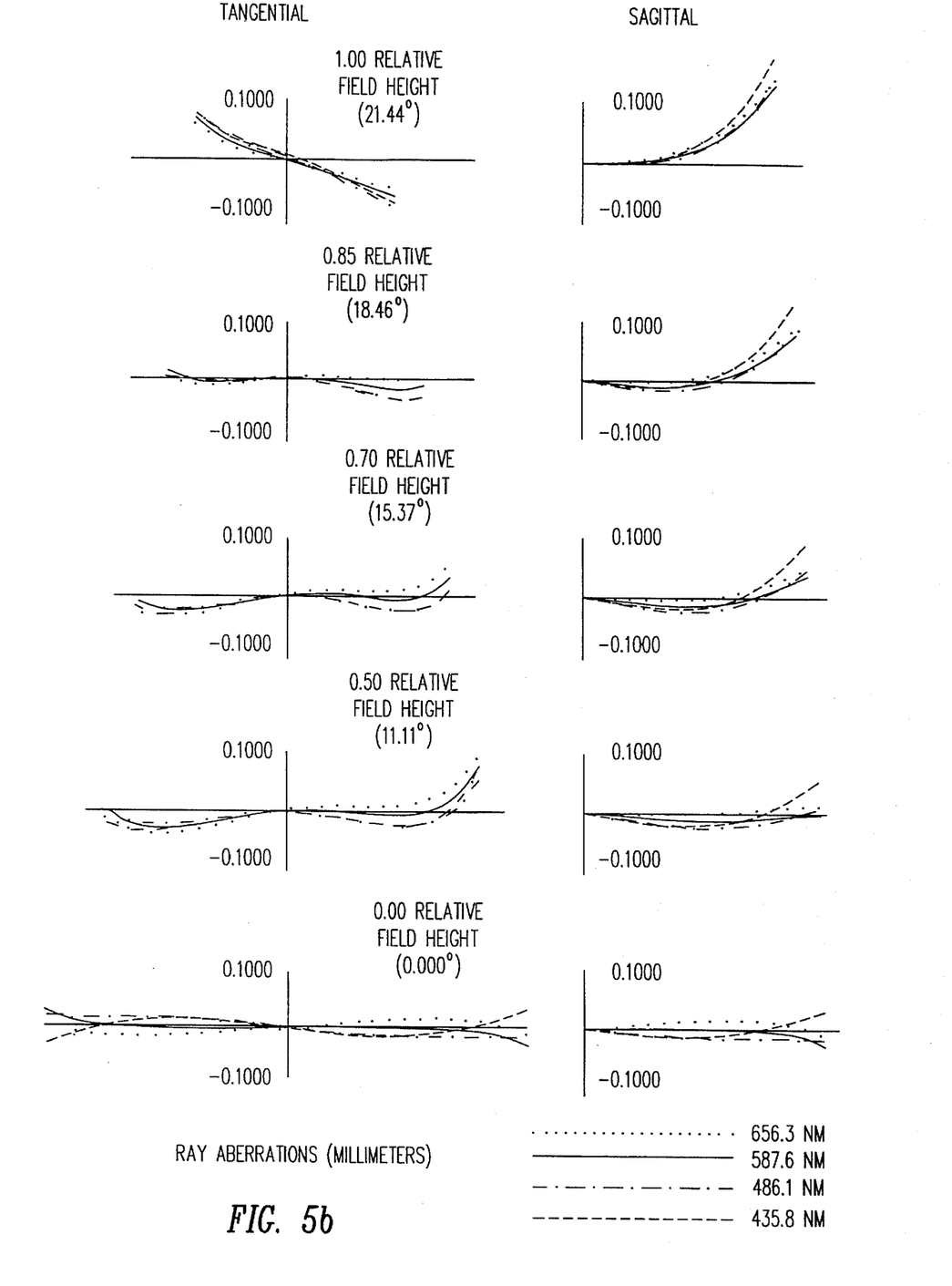

Detail of the optical performance of the lens system of FIG. 4 is shown respectively in FIG. 5a and 5b and the corresponding lens prescription is shown in Table IV.

TABLE IV

Lens prescription for Example 2.

| | RDY | THI | GLA | Element |
|---|---|---|---|---|
| OBJ: | INFINITY | INFINITY | | |
| 1: | 107.97905 | 6.700000 | 'g1' | E'1 |
| 2: | 0185.91914 | 0.100000 | | |
| 3: | 30.72433 | 8.661343 | 840421.433470 | E'2 |
| 4: | 50.87642 | 1.744322 | | |
| 5: | 152.21160 | 2.000000 | 688930.310790 | E'3 |
| 6: | 23.18947 | 6.451361 | | |
| STO: | INFINITY | 5.957822 | | |
| 8: | −24.47914 | 2.800000 | 728250.283410 | E'4 |
| 9: | 85.23343 | 8.346506 | 840421.433470 | E'5 |
| 10: | −37.41160 | 0.100000 | | |
| 11: | 96.12875 | 7.800000 | 'g11' | E'6 |

TABLE IV-continued

|  | 12:<br>IMG: | −53.69734<br>INFINITY | 38.097298<br>−0.048416 |  |  |
|---|---|---|---|---|---|
| WL | 656.28 | 587.56 | 546.07 | 486.13 | 435.84 |
| 'g1' | 1.791419 | 1.796681 | 1.800858 | 1.808978 | 1.818801 |
| C1 | −0.3439E−01 | −0.3475E−01 | −0.3504E−01 | −0.3562E−01 | 0.3634E−01 |
| 'g11' | 1.514322 | 1.516800 | 1.518723 | 1.522384 | 1.526703 |
| C1 | 0.4106E−01 | 0.4149E−01 | 0.4183E−01 | 0.4252E−01 | 0.4336E−01 |

INFINITE CONJUGATES

| EFL | 54.9998 |
|---|---|
| BFL | 38.0973 |
| FFL | −16.2817 |
| FNO | 1.4111 |
| IMG DIS | 38.0973 |
| OAL | 49.8614 |

PARAXIAL IMAGE

| HT | 21.6000 |
|---|---|
| ANG | 21.4414 |

ENTRANCE PUPIL

| DIA | 38.9761 |
|---|---|
| THI | 29.1148 |

EXIT PUPIL

| DIA | 47.2213 |
|---|---|
| THI | −28.5374 |

In order to further correct higher order optical aberrations present in the lens system of FIG. 2, the first cemented doublet E2, E3 of FIG. 2 was separated in the embodiment of FIG. 4 and the resulting air lens between elements E'2 and E'3 in FIG. 4 provided. In addition, the configuration was altered compared to FIG. 2 such that both the front and rear GRIN lens elements E'1 and E'6 have dispersion gradients in addition to index gradients. This allows increased freedom to use the GRIN lens properties to balance chromatic aberrations while using optical power distribution and/or lens bending to balance the monochromatic aberrations. The front GRIN lens element E'1 has an index gradient, $\Delta n(\lambda_2) \cong -0.233$, and a dispersion gradient, $\Delta v(\lambda_2) \cong +15.3$, and as such provides both monochromatic aberration and chromatic aberration correction for the entire lens assembly. Table V represents the data used to model the GRIN material of the front element E"1.

TABLE V

Description of front GRIN lens element, Example 2.

| Wavelength(nm) | | $n_0(\lambda)$ | $c_1(\lambda)$ |
|---|---|---|---|
| $\lambda_1$ | 656.28 | 1.791419 | −0.03439 |
| $\lambda_2$ | 587.56 | 1.796681 | −0.03475 |
| $\lambda_3$ | 546.07 | 1.800858 | −0.03504 |
| $\lambda_4$ | 486.13 | 1.808978 | −0.03526 |
| $\lambda_5$ | 435.84 | 1.818801 | −0.03634 |

Since the $c_1$ coefficient of this GRIN material is negative, the index of refraction decreases as one moves from the front to the back of the lens element.

The rear GRIN lens element E'6 has an index gradient, $\Delta n(\lambda_2) \cong +0.324$, and a dispersion gradient, $\Delta v(\lambda_2) \cong -20.8$, and as such provides both monochromatic aberration and chromatic aberration correction for the entire lens assembly. Table VI represents the data used to model the GRIN material of the rear element E'6.

TABLE VI

Description of rear GRIN lens element, Example 2.

| Wavelength(nm) | | $n_0(\lambda)$ | $c_1(\lambda)$ |
|---|---|---|---|
| $\lambda_1$ | 656.28 | 1.514322 | −0.04106 |
| $\lambda_2$ | 587.56 | 1.516800 | −0.04149 |
| $\lambda_3$ | 546.07 | 1.518723 | −0.04183 |
| $\lambda_4$ | 486.13 | 1.522384 | −0.04252 |
| $\lambda_5$ | 435.84 | 1.526703 | −0.04336 |

Since the $c_1$ coefficient of this GRIN material is positive, the index of refraction increases as one moves from the front to the back of the lens element E'6.

In this lens system both the front E'1 and the rear E'6 GRIN lens elements have significant index and dispersion gradients and as such each contributes to the overall correction of monochromatic as well as chromatic aberration correction.

The lens systems embodiments shown here are illustrative and are not limiting; further modifications in the location of the GRIN lens elements and of the nature and location of the non-GRIN lens are possible in accordance with the present invention. Also, other qualities of the various GRIN and non-GRIN lens elements may be altered as will be well understood by one of ordinary skill in the art. It is especially found that GRIN lens elements are substitutable (with suitable design changes) for aspherical lens elements.

More generally, it has been found that the ability of a lens element to corrector balance aberrations in an optical system is also related to the optical power such a lens element has compared to the optical power of the entire system. With that in mind, a ratio of the optical power of the GRIN lens element to that of the total lens system is defined herein with reference to FIG. 1. This ratio provides a simple measure of the overall effect an individual GRIN lens element has on its ability to affect the aberration of the total optical system.

Therefore it has been found that in accordance with the invention and as illustrated in the above examples, the following properties are present:

A six lens element photographic objective lens system which utilizes two positive optical power linear axial GRIN lens elements in the following locations:

one GRIN lens element before an aperture stop where $n_{Fr} > n_R$, and one GRIN lens element after the aperture stop where $n_{Fr} < n_R$, per FIG. 1.

Each of the front and rear GRIN lens elements also satisfies at least one of the following conditions:

$1/10 \leq \Delta n/n_{Fr} \leq 3/4$, or $1/6 \leq \Delta v/v_{Fr} \leq 1/3$, where $\Delta n = n_{Fr} - n_R$ and $\Delta v = v_{Fr} - v_R$ as in FIG. 1.

As to relative optical power, the GRIN lens element in the front group satisfies:

$1/2 \leq \beta \leq 3$ and the GRIN lens element in the rear group satisfies:

$1/2 \leq \beta \leq 1$ where $\beta = (f_{GRIN}/f_{TOTAL})$
and where:
$f_{GRIN}$=effective focal length of a GRIN lens element
$f_{TOTAL}$=effective focal length total lens system Thus, by combining the above conditions for certain embodiments of the invention, the front group GRIN lens element satisfies:

$3/20 \leq \beta \cdot |\Delta n/n_{Fr}| \leq 9/4$ and/or $1/4 \leq \beta \cdot |\Delta v/v_{Fr}| \leq 1/2$ and the rear group GRIN lens element satisfies:

$1/20 \leq \beta \cdot |\Delta n/n_{Fr}| \leq 3/4$ and/or $1/12 \leq \beta \cdot |\Delta v/v_{Fr}| \leq 1/3$ The above description is illustrative and not limiting, further modifications will be apparent to one skilled in the art in light of this disclosure and are intended to fall within the scope of the appended claims.

I claim:

1. A lens system comprising, in order from an object side to an image side extending along an optical axis:

a first axial gradient index lens element of positive optical power and having an index of refraction gradient having an absolute value in a range of $1/10$ to $3/4$ of an index of refraction at its object side surface;

a plurality of lens elements; and a second axial gradient index lens element of positive optical power and having an index of refraction gradient having an absolute value in a range of $1/10$ to $3/4$ of an index of refraction at its object side surface.

2. The lens system of claim 1, further comprising an aperture stop located between the first and second gradient index lens elements.

3. The lens system of claim 1, wherein the first axial gradient index lens element has a higher index of refraction nearer the object side than nearer the image side, and the second gradient index lens element has a higher index of refraction nearer the image side than nearer the object side.

4. The lens system of claim 1, wherein the first and second axial gradient index lens elements each have a dispersion gradient having an absolute value in the range of $1/6$ to $1/3$ of a dispersion value at its object side surface.

5. The lens system of claim 1, wherein the first gradient axial index lens element has a focal length in a range of $1\frac{1}{2}$ to 3 of a focal length of the entire lens system.

6. The lens system of claim 5, wherein the second axial gradient index lens element has a focal length in a range of $1/2$ to 1 of a focal length of the entire lens system.

7. The lens system of claim 1, wherein the plurality of lens elements includes four lens elements, and an aperture stop.

8. The lens system of claim 1, wherein the lens system includes at least six lens elements.

9. A lens system comprising, in order from an object side to an image side extending along an optical axis:

a first axial gradient index lens of positive optical power, satisfying the relation
$3/20 \leq \beta \cdot |\Delta n/n_{Fr}| \leq 9/4$;

a plurality of lens elements; and a second axial gradient index lens element of positive power, satisfying the relation
$1/20 \leq \beta \cdot |\Delta n/n_{Fr}| \leq 3/4$;

where for each lens element:

$\beta$=(focal length of the lens element)/(focal length of the lens system), $\Delta n$=index of refraction gradient from an image side to an object side surface, and $n_{Fr}$=index of refraction at the object side surface.

10. The lens system of claim 9, the first axial gradient index lens element further satisfying the relation:

$1/4 \leq \beta \cdot |\Delta v/v_{Fr}| \leq 1/2$ where for each lens element:

$\Delta v$=dispersion value gradient from an object side to an image side; and $V_{Fr}$=dispersion value at the object side surface.

11. The lens system of claim 10, the second axial gradient index element further satisfying the relation:

$1\frac{1}{2} \leq \beta |\Delta v/v_{Fr}| \leq 1/3$.

* * * * *